US008057927B2

United States Patent

(12) United States Patent
Igarashi et al.

(10) Patent No.: US 8,057,927 B2
(45) Date of Patent: Nov. 15, 2011

(54) MAGNETIC RECORDING MEDIUM AND INFORMATION STORAGE APPARATUS

(75) Inventors: Satoshi Igarashi, Higashine (JP); Tohru Horie, Higashine (JP); Ryo Kurita, Kawasaki (JP); Isatake Kaitsu, Higashine (JP); Akira Kikuchi, Higashine (JP); Shinya Sato, Higashine (JP)

(73) Assignee: Showa Denko K.K., Tokyo (JP)

( * ) Notice: Subject to any disclaimer, the term of this patent is extended or adjusted under 35 U.S.C. 154(b) by 227 days.

(21) Appl. No.: 12/497,819

(22) Filed: Jul. 6, 2009

(65) Prior Publication Data

US 2010/0007988 A1 Jan. 14, 2010

(30) Foreign Application Priority Data

Jul. 11, 2008 (JP) ................................ 2008-181798

(51) Int. Cl.
*G11B 5/66* (2006.01)

(52) U.S. Cl. .................................................... 428/831.2

(58) Field of Classification Search ........................ None
See application file for complete search history.

(56) References Cited

U.S. PATENT DOCUMENTS

2009/0081483 A1* 3/2009 Sonobe et al. ................ 428/828

FOREIGN PATENT DOCUMENTS

JP A 2006-268972 10/2006
JP A 2006-309919 11/2006

* cited by examiner

*Primary Examiner* — Holly Rickman

(74) *Attorney, Agent, or Firm* — Greer, Burns & Crain, Ltd.

(57) ABSTRACT

A magnetic recording medium includes a nonmagnetic granular layer that has a granular structure in which a plurality of nonmagnetic grains made of a nonmagnetic material are separated from one another by a Cr oxide. The magnetic recording medium further includes a magnetic granular layer that is formed on the nonmagnetic granular layer and has a granular structure in which a plurality of magnetic grains made of a magnetic material are separated from one another by a nonmagnetic material.

16 Claims, 7 Drawing Sheets

200

| | |
|---|---|
| PROTECTIVE FILM | 207 |
| RECORDING LAYER | 206 |
| NONMAGNETIC GRANULAR LAYER | 205 |
| INTERLAYER | 204 |
| UNDERLAYER | 203 |
| SOFT MAGNETIC LAYER | 202 |
| SUBSTRATE | 201 |

MAGNETIC RECORDING MEDIUM AND INFORMATION STORAGE APPARATUS

CROSS-REFERENCE TO RELATED APPLICATION

This application is based upon and claims the benefit of priority of the prior Japanese Patent Application No. 2008-181798, filed on Jul. 11, 2008, the entire contents of which are incorporated herein by reference.

FIELD

The embodiment discussed herein is related to a magnetic recording medium into which information is magnetically recorded, and an information storage apparatus including such a magnetic recording medium.

BACKGROUND

In the computer field, a large amount of information has been handled on a daily basis. A hard disc drive (HDD) is used as an example of an information storage apparatus for recording and reproducing such a large amount of information. The HDD is characterized by having a large storage capacity and accessing information therein at a high speed, and includes a disk-shaped magnetic recording medium and a magnetic head that records information into the magnetic recording medium.

Here, increase in recording density has always been demanded in the magnetic recording medium included in the information storage apparatus. However, in general, there are obstacles to increasing the recording density of a magnetic recording medium. One of the obstacles is so-called medium noise. Medium noise is caused by disturbance in magnetization orientation that carries information in a magnetic recording medium, and appears in a reproduction signal obtained in reproducing information from the magnetic recording medium. In order to be recorded into the magnetic recording medium, information needs to be recorded in an area large enough to provide signal components each having a sufficiently high level not to be buried in this noise (medium noise) attributable to disturbance in magnetization orientation. Accordingly, the information recording density is reduced as the medium noise level is increased.

A method for suppressing disturbance in magnetization orientation, which causes medium noise, is to increase the coercivity of a recording layer for allowing information to be recorded therein in the magnetic recording medium. The coercivity of a recording layer can be increased by reducing the grain size of the magnetic grains forming the recording layer and thus suppressing magnetic interactions among the magnetic grains. For this reason, many attempts have been made to reduce the grain size of the magnetic grains, in order to reduce the medium noise and thus to achieve high recording density of a magnetic recording medium.

For example, the following techniques have been proposed to reduce the grain size of the magnetic grains. In one of the techniques, a recording layer is formed to have a laminated structure of multiple layers. In another technique, multiple magnetic grains in a recording layer are segregated from one another by a nonmagnetic material concentrated at interfaces between the magnetic grains (grain boundaries) to form a granular structure. However, the latter technique of forming a recording layer with a granular structure often causes the following defects in the recording layer. Specifically, in this technique, some of the magnetic grains lying near the surface on which the recording layer is formed might be bonded to one another in the recording layer, which deteriorates the separation of the magnetic grains from one another in the recording layer. With this background, a technique to avoid such defects has been proposed. In this technique, under a recording layer with such a granular structure, formed is a nonmagnetic granular layer having a granular structure in which multiple nonmagnetic grains made of a nonmagnetic material are segregated from one another by another material (see Japanese Laid-open Patent Publication Nos. 2006-309919 and 2006-268972, for example).

In the technique of forming a recording layer with a laminated structure, a first layer is firstly formed as a base for constantly providing fine magnetic grains, and second and subsequent layers are formed on the first layer by growing such fine magnetic grains thereon. Meanwhile, in the technique of forming a recording layer with a granular structure, depending on the amount of a nonmagnetic material at the grain boundaries, grains of a magnetic material are segregated from one another and thus are reduced in grain size.

In this regard, the technique of forming a recording layer with a granular structure has been attracting attention because of its high effectiveness of increasing the coercivity of the recording layer while reducing the medium noise level. This effectiveness is attributed to the fact that, in this technique, not only multiple magnetic grains in the recording layer are reduced in grain size but also segregated from one another by a nonmagnetic material, so that magnetic interactions among the magnetic grains are further suppressed.

Moreover, in the technique of forming a nonmagnetic granular layer, magnetic grains in a recording layer are formed on nonmagnetic grains appearing on the top surface of the nonmagnetic granular layer, on which surface nonmagnetic grains are sufficiently separated from one another. Accordingly, this technique can provide more reliable separation of the magnetic grains from one another in the recording layer.

Recently, the demand for increasing the recording density of a magnetic recording medium has been growing more and more. In response, it has also been demanded that further increase in recording density be achieved in a magnetic recording medium using a nonmagnetic granular layer as described above by a method such as further reducing the grain size of magnetic grains in a recording layer.

SUMMARY

A magnetic recording medium includes:

a nonmagnetic granular layer that has a granular structure in which a plurality of nonmagnetic grains made of a nonmagnetic material are separated from one another by a Cr oxide; and a magnetic granular layer that is formed on the nonmagnetic granular layer and has a granular structure in which a plurality of magnetic grains made of a magnetic material are separated from one another by a nonmagnetic material.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, with reference to the drawings, description will be given of a specific embodiment of a magnetic recording medium and an information storage apparatus whose basic features have been described above.

Figure 1:
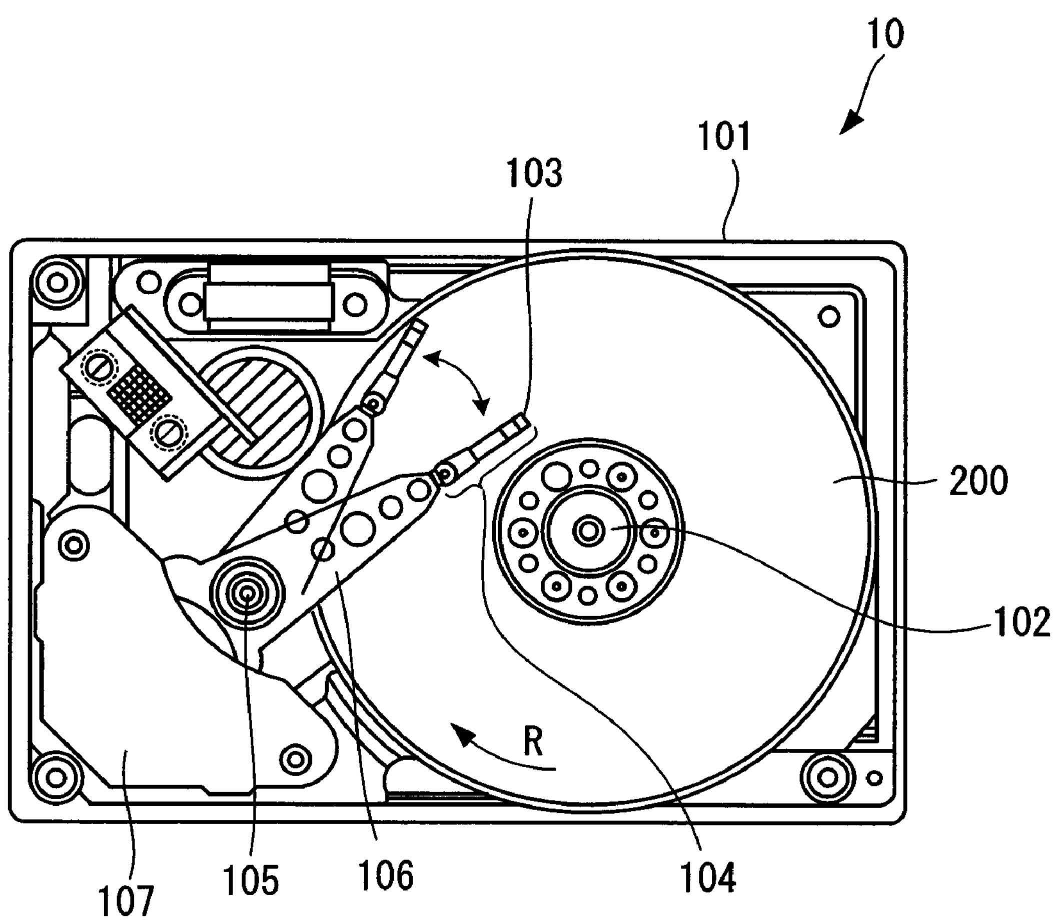
FIG. 1 illustrates a hard disc drive (HDD), which is an example of an information storage apparatus according to an embodiment of the present invention.

FIG. 1 illustrates a hard disc drive (HDD), which is an example of the information storage apparatus according to the present invention.

In a housing 101 of an HDD 10 illustrated in FIG. 1, housed are: a magnetic disk 200 caused to rotate by a rotating shaft 102 to which the magnetic disk 200 is fitted; a head gimbal assembly 104 holding, at the tip, a magnetic head 103 that records and reproduces information into/from the magnetic disk 200; a carriage arm 106 that has the head gimbal assembly 104 fixed thereto, and that rotates about an arm shaft 105 to move along a surface of the magnetic disk 200; and an arm actuator 107 that drives the carriage arm 106.

In recording information into the magnetic disk 200 or reproducing information recorded in the magnetic disk 200, the arm actuator 107 firstly drives the carriage arm 106 so as to position the magnetic head 103 onto an intended track on the rotating magnetic disk 200. Then, with the rotation of the magnetic disk 200, the magnetic head 103 traces the tracks of the magnetic disk 200, and thus sequentially records or reproduces multiple information pieces into/from the respective tracks.

Here, the present embodiment employs a vertical magnetic recording in which information is recorded into the magnetic disk 200 by utilizing magnetization perpendicular to the disk surface thereof. Accordingly, the magnetic disk 200 has a recording layer whose easy magnetization axis extends perpendicular to the disk surface. The recording layer will be described later. Information is recorded into the recording layer by utilizing two magnetization states in which: magnetization oriented to the front-surface side of the magnetic disk 200; and magnetization oriented to the back-surface side of the magnetic disk 200.

In recording information, an electrical recording signal is inputted to the magnetic head 103 that is brought close to the magnetic disk 200 as described above, so that the magnetic head 103 applies, to the magnetic disk 200, a magnetic field having a polarity according to the recording signal. This orients magnetization in the recording layer to one of the front-surface and back-surface sides of the magnetic disk 200 in accordance with the polarity of the applied magnetic field, and thereby the information is recorded in the recording layer. On the other hand, in reproducing information, the magnetic head 103 detects a very small magnetic field generated by magnetization in the recording layer, and thereby the information is taken out therefrom as an electrical reproduction signal according to the polarity of this very small magnetic field.

Figure 2:
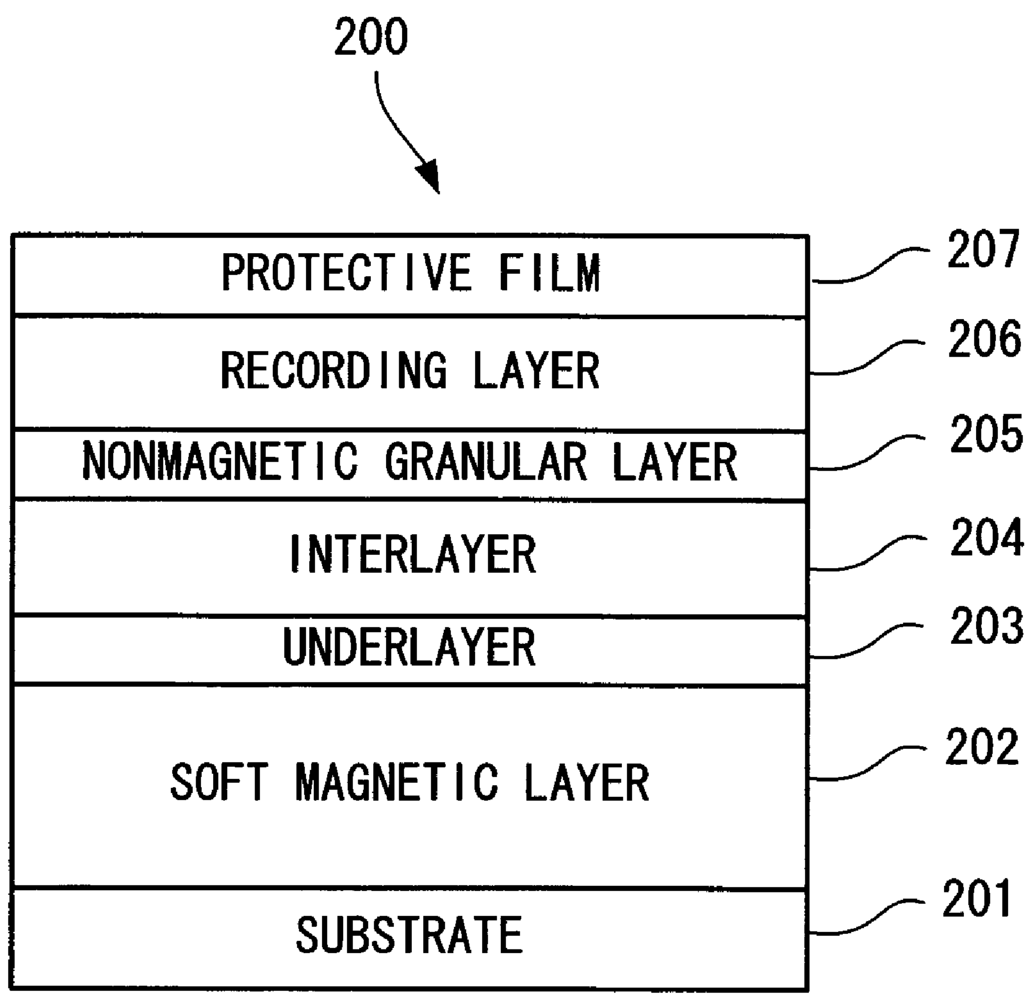
FIG. 2 schematically illustrates a cross section of a magnetic disk illustrated in FIG. 1.

FIG. 2 schematically illustrates a cross section of the magnetic disk 200 illustrated in FIG. 1.

As illustrated in FIG. 2, the magnetic disk 200 is formed by stacking a disk substrate 201, a soft magnetic layer 202, an underlayer 203, an interlayer 204, a nonmagnetic granular layer 205, a recording layer 206 and a protective film 207 in this order. The disk substrate 201 is made of glass. The soft magnetic layer 202 is an amorphous layer made of a Co alloy, which is a soft magnetic material. The underlayer 203 is made of an Ni alloy. The interlayer 204 is made of Ru. The nonmagnetic granular layer 205 has a granular structure in which multiple nonmagnetic grains are segregated from one another by $Cr_2O_3$ concentrated at the grain boundaries. The recording layer 206 has a three-layer structure including multiple magnetic grains made of CoCrPt, which is a ferromagnetic material. Specifically, the recording layer 206 has a granular structure in which the magnetic grains are segregated from one another by $TiO_2$ concentrated at the grain boundaries. The protective film 207 is made of diamond-like carbon (DCL). The nonmagnetic granular layer 205 and the recording layer 206 are respectively equivalent to examples of a nonmagnetic granular layer and a magnetic granular layer in described above in SUMMARY.

Here, in the magnetic granular layer described above in SUMMARY, it is preferable that the magnetic grains are made of at least one alloy selected from CoCr, CoCrPt, CoCrPtCu, CoCrPtB and CoCrPtBCu, and the nonmagnetic material is an oxide or a nitride containing at least one material selected from Si, Ti, Cr, Ta, Zr, W and Nb.

The alloys such as CoCr and CoCrPt are favorable magnetic materials, while the materials such as $SiO_2$ and $TiO_2$ are favorable nonmagnetic materials. By combining any of these magnetic materials and any of these nonmagnetic materials, a granular structure as described above can be easily implemented. The recording layer 206 of the present embodiment, which includes CoCrPt and $TiO_2$ as magnetic and nonmagnetic materials, respectively, is also equivalent to an example of the magnetic granular layer described above in SUMMARY The soft magnetic layer 202, which is formed on the top surface of the disk substrate 201, serves as a magnetic path allowing lines of magnetic force in the magnetic field that is applied by the magnetic head 103 in information recording to return to the magnetic head 103 therethrough.

Next, description will be given of the recording layer 206, in advance of the underlayer 203, the interlayer 204 and the nonmagnetic granular layer 205.

As described above, the present embodiment employs the vertical magnetic recording. Accordingly, the recording layer 206 is formed such that the magnetic grains of CoCrPt therein can have a hexagonal close-packed crystal structure whose C-axis orients in the thickness direction of the recording layer 206, in order to orient the easy magnetization axis of the magnetic grains perpendicular to the disk surface. More specifically, each magnetic grain in the recording layer 206 is a columnar grain having the above crystal structure grown in the thickness direction of the recording layer 206. In addition, the recording layer 206 has a granular structure in which $TiO_2$, which is a nonmagnetic material, is concentrated at the grain boundaries of these columnar magnetic grains. This allows each columnar magnetic grain in the recording layer 206 to have a strong magnetic anisotropy with the easy magnetization axis orienting perpendicular to the disk surface. Moreover, since the recording layer 206 has the granular structure, the columnar magnetic grains therein are separated from one another by $TiO_2$, which is a nonmagnetic material.

This leads to reduction in grain size of the magnetic grains, and thus good suppression of magnetic interactions among the magnetic grains.

Here, the columnar magnetic grains in the recording layer 206 are obtained basically by forming the interlayer 204 made of Ru crystals each having a hexagonal close-packed crystal structure, and epitaxially growing CoCrPt crystals of this structure thereon. In other words, the interlayer 204 serves as a controller of the crystal structure of each magnetic grain in the recording layer 206. Hence, the interlayer 204 is formed such that each Ru crystal therein can have a hexagonal close-packed crystal structure whose C-axis orients in the thickness direction of the interlayer 204. However, if the interlayer 204 is formed directly on the soft magnetic layer 202, which is amorphous as described above, the amorphousness makes it difficult to orient the C-axis of the hexagonal close-packed structure in the interlayer 204 in its thickness direction.

In the present embodiment, the underlayer 203 formed between the interlayer 204 and the soft magnetic layer 202 orients the C-axis of the hexagonal close-packed structure in the interlayer 204 in its thickness direction, and thus serves as a controller of crystalline orientation in the interlayer 204. To this end, the underlayer 203 is formed of an Ni alloy having a face-centered cubic lattice crystal structure.

A film having a face-centered cubic lattice crystal structure is likely to have a surface on which the [1,1,1] planes appear, and if crystals each having a hexagonal close-packed structure are grown on the [1,1,1] planes, their C-axes are likely to orient perpendicular to the [1,1,1] planes. Hence, in the present embodiment, the Ru crystal structures in the interlayer 204 as described above are obtained by firstly forming the underlayer 203 with a face-centered cubic lattice crystal structure on the amorphous soft magnetic layer 202, and then forming the interlayer 204 on the underlayer 203.

As described above, since the recording layer 206 has a granular structure, the magnetic grains therein are well separated from one another by $TiO_2$, so that reduction in grain size of the magnetic grains as well as suppression of magnetic interactions among the magnetic grains are achieved. On the other hand, if the recording layer 206 were formed directly on the interlayer 204, some of the magnetic grains lying near the boundary with the interlayer 204 would be highly likely to be bonded to one another in the recording layer 206 since the interlayer 204 does not have a granular structure.

For this reason, in the present embodiment, the nonmagnetic granular layer 205 is formed between the interlayer 204 and the recording layer 206.

As described above, the nonmagnetic granular layer 205 has a granular structure in which multiple nonmagnetic grains are segregated from one another by $Cr_2O_3$ concentrated at the grain boundaries. Made of a nonmagnetic material, the nonmagnetic grains have no potential to magnetically affect the recording layer 206. More specifically, in the present embodiment, the nonmagnetic grains are made of CoCr that is nonmagnetic with a Cr content adjusted in a range from "30 at %" to "50 at %." In addition, the $Cr_2O_3$ content in the nonmagnetic granular layer 205 is adjusted to "12 mol %" or less in order to achieve good segregation of $Cr_2O_3$.

Each of the CoCr crystals forming the nonmagnetic grains in the nonmagnetic granular layer 205 has a hexagonal close-packed structure. To achieve this structure, the nonmagnetic granular layer 205 is formed by epitaxially growing CoCr crystals on the Ru crystals of the interlayer 204. In this process, the CoCr crystals are grown to have the same crystal structure as the Ru crystals do, that is, a hexagonal close-packed structure whose C-axis orients in the thickness direction of the nonmagnetic granular layer 205. As a result, the nonmagnetic grains of CoCr become columnar grains stacked in the thickness direction of the nonmagnetic granular layer 205, and $Cr_2O_3$ is concentrated at the grain boundaries of the columnar nonmagnetic grains. In this way, a granular structure is formed.

In the process where the recording layer 206 is formed on the nonmagnetic granular layer 205, CoCrPt crystals, which form the magnetic grains of the recording layer 206, are epitaxially grown on the columnar nonmagnetic grains of the nonmagnetic granular layer 205. In this process, the CoCrPt crystals are grown to have the same crystal structure as the CoCr crystals forming the nonmagnetic grains, and thus have the same crystal structure as the Ru crystals in the interlayer 204, based on which the crystal structure of CoCr is obtained. Specifically, the CoCrPt crystals are grown to have a hexagonal close-packed structure whose C-axis orients in the thickness direction of the recording layer 206. As a result, the nonmagnetic grains of CoCrPt become columnar grains stacked in the thickness direction of the recording layer 206, and $TiO_2$ is concentrated at the grain boundaries of the columnar nonmagnetic grains. In this way, a granular structure is formed. Since the nonmagnetic granular layer 205 is formed on the interlayer 204, which does not have a granular structure, some of the nonmagnetic grains lying near the boundary with the interlayer 204 are highly likely to be bonded to one another in the nonmagnetic granular layer 205. However, such grain bonding occurs only near the boundary with the interlayer 204, which does not have a granular structure, so that the nonmagnetic grains that appear at the surface on which the recording layer 206 is to be formed are sufficiently separated from each other. Since the magnetic grains in the recording layer 206 are made to grow on the nonmagnetic grains that appear on this surface, separation of the magnetic grains from one another in the recording layer 206 is improved.

This indicates that it is preferable that the magnetic granular layer described above in SUMMARY is formed by growing the magnetic grains on the nonmagnetic grains in the nonmagnetic granular layer.

The recording layer 206 of the present embodiment is also equivalent to an example of the magnetic granular layer according to this additional feature.

Moreover, as described above, in the present embodiment, the nonmagnetic grains of the nonmagnetic granular layer 205 are made of nonmagnetic CoCr having a hexagonal close-packed crystal structure whose C-axis orients in the thickness direction of the nonmagnetic granular layer 205. This allows the magnetic grains of the recording layer 206 to readily have a hexagonal close-packed crystal structure, which is suitable for the vertical magnetic recording.

This indicates that for the magnetic recording medium described above in SUMMARY, it is preferable that the nonmagnetic granular layer has, as the nonmagnetic grains, nonmagnetic grains of a hexagonal close-packed crystal structure whose C-axis orients in the thickness direction of the nonmagnetic granular layer. It is further preferable that the nonmagnetic grains in the nonmagnetic granular layer are made of CoCr.

The nonmagnetic granular layer 205 of the present embodiment is also equivalent to an example of the nonmagnetic granular layers in these additional features.

Furthermore, as described above, in the present embodiment, the nonmagnetic granular layer 205 is formed on the interlayer 204 made of Ru having a hexagonal close-packed crystal structure whose C-axis orients in its thickness direction. This allows simple implementation of the nonmagnetic grains of the nonmagnetic granular layer 205 having a hexagonal close-packed crystal structure as described above, in order to provide the magnetic grains of the recording layer 206 with the above-described crystal structure.

This indicates that the magnetic recording medium described above in SUMMARY preferably further includes an interlayer made of a nonmagnetic material, and the nonmagnetic granular layer is preferably formed on the interlayer.

Further, the interlayer preferably includes a nonmagnetic material having a hexagonal close-packed crystal structure whose C-axis orients in the thickness direction of the interlayer.

The interlayer 204 of the present embodiment is equivalent to an example of the interlayers in these additional features, while the nonmagnetic granular layer 205 is also equivalent to an example of the nonmagnetic granular layers in these additional features.

Furthermore, when the magnetic recording medium describe above in SUMMARY includes the above-described interlayer, the interlayer is preferably made of a material containing Ru or a material containing a $RuX_2$ alloy, where X is Co, Cr, W or Re.

Being nonmagnetic and having a hexagonal close-packed structure, Ru and the $RuX_2$ alloy can be favorably formed into the interlayer. The interlayer 204 of the present embodiment, formed of Ru, is also equivalent to an example of the interlayer of this applied form.

In addition, the interlayer 204 of the present embodiment is formed on the underlayer 203 that has a face-centered cubic lattice crystal structure, and that can be formed on the amorphous soft magnetic layer 202 so that the [1,1,1] planes can appear on the surface of the underlayer 203. This method can provide the interlayer 204 having a favorable crystal structure as described above, since if crystals each having a hexagonal close-packed structure are grown on the [1,1,1] planes, their C-axes are likely to orient perpendicular to the [1,1,1] planes.

This indicates that when the magnetic recording medium describe above in SUMMARY includes the above-described interlayer, it is preferable that the magnetic recording medium further includes: a soft magnetic underlayer made of a soft magnetic material; and an underlayer that is formed on the soft magnetic underlayer, and is made of a nonmagnetic material having a face-centered cubic lattice crystal structure, and having a surface on which a [1,1,1] plane appears, in which the interlayer is formed on the underlayer.

Next, by use of an actual example, description will be given of the fact that provision of a nonmagnetic granular layer allows better separation of magnetic grains from one another in a recording layer, which leads to suppression of magnetic interactions among the magnetic grains, and thus to reduction in medium noise in the magnetic disk.

Figure 3:
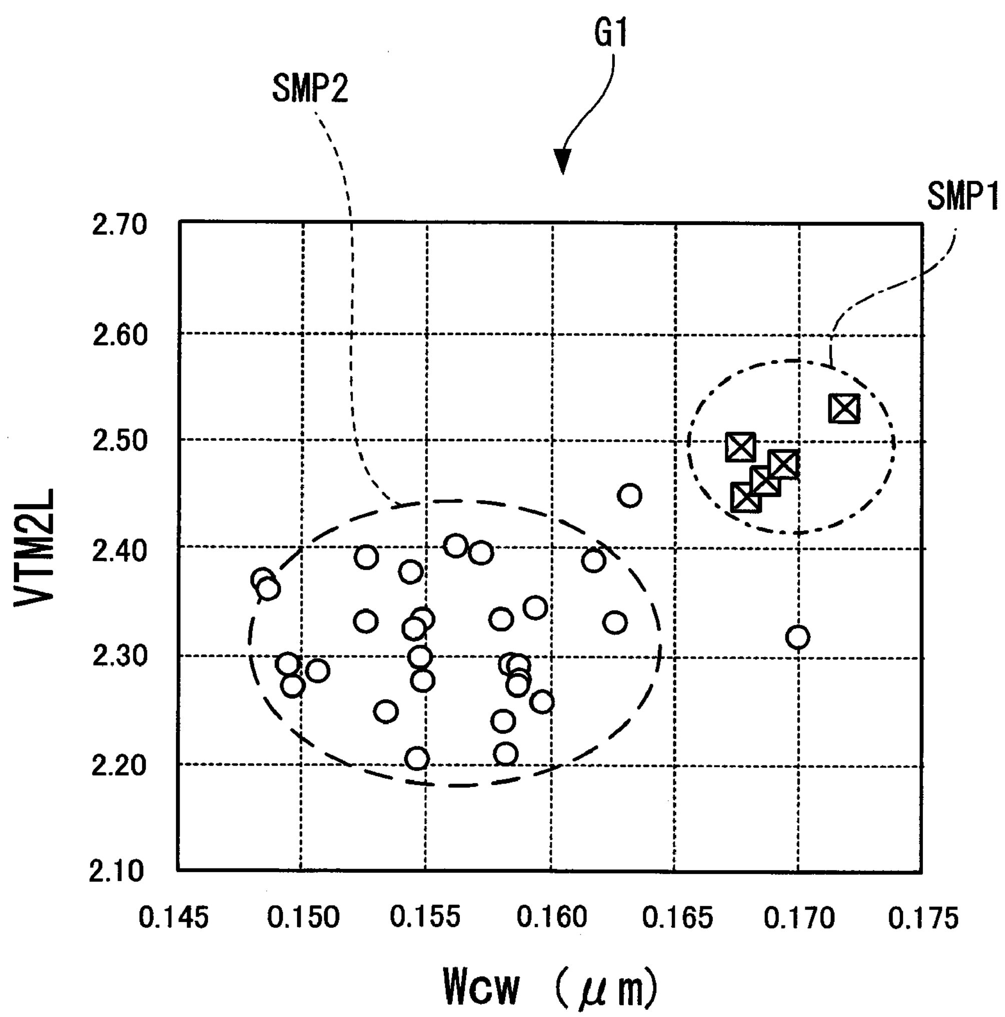
FIG. 3 illustrates how magnetic interactions among magnetic grains are suppressed so that medium noise in a magnetic disk is reduced.

FIG. 3 illustrates how magnetic interactions among the magnetic grains are suppressed so that medium noise in the magnetic disk is reduced.

FIG. 3 depicts a graph G1 describing medium noise levels and interactions obtained from first and second samples. The first sample is a magnetic disk with no nonmagnetic granular layer, and thus a recording layer is formed directly on an interlayer in the first sample. The second sample is a magnetic disk with a nonmagnetic granular layer formed therein.

Note that, in the example of FIG. 3, $SiO_2$ is used as material to be concentrated at the grain boundaries of the nonmagnetic grains in the nonmagnetic granular layer of the second sample, in place of $Cr_2O_3$ used in the present embodiment. Conventionally, $SiO_2$, as well as $TiO_2$, are often used as material to be concentrated at the grain boundaries in a granular structure. In addition, nonmagnetic grains in the nonmagnetic granular layer are made of CoCr with a Cr content of "40 at %" or less, while the $SiO_2$ content in the nonmagnetic granular layer is "8 mol %" or less. In addition, this nonmagnetic granular layer of the second sample has a thickness of "4 nm."

The first and second samples each have the same structure as the magnetic disk 200 of the present embodiment illustrated in FIG. 2 other than the structure of the nonmagnetic granular layer.

In the graph G1, the medium noise level is represented by an indicator termed as Viterbi trellis margin 2L (VTM2L), which indicates an error rate in a reproduction signal. Meanwhile, in this graph G1, the magnitude of magnetic interactions among magnetic grains is represented by an effective track width indicating spreading of each recording track.

The VTM2L indicates an error rate of a reproduction signal by expressing the degree of uncertainty of a decoding result obtained by a Viterbi decoding method, one of the methods for acquiring recorded information by decoding a signal outputted by a magnetic head during a reproducing operation. In the reproducing operation, a magnetic head outputs a reproduction signal including a sequence of signal values each corresponding to a 1-bit information piece. In the Viterbi decoding method, for each signal value sequence having a predetermined number of bits, prepared are two candidates for an information sequence that the signal value sequence is expected to represent. Then, a difference is obtained between: the signal value of each bit included in the signal sequence; and the information piece of the corresponding bit included in one of these information sequence candidates. The square sum (metric value) of the differences obtained as above is calculated for each information sequence candidate, and the candidate having the smaller metric value is selected as the information sequence that signal sequence represents. Here, the VTM2L expresses the number of signal value sequences each satisfying the condition that the difference between the metric values of the respective two candidates for the signal value sequence is smaller than a predefined threshold, among multiple signal sequences obtained from a reproduction signal. Specifically, the reproduction signal is outputted by the magnetic head in reproducing information of approximately 400 thousand bits recorded in an area covering 100 sectors of a magnetic disk, and the signal sequences are obtained by dividing the reproduction signal by the predetermined number of bits. The fact that the difference between the metric values of the respective two candidates for the signal value sequence is smaller than a predefined threshold signifies that the medium noise level in the signal sequence is high enough to distort the signal sequence, and thus to make the decoding result uncertain enough to make it difficult to determine which candidate is correct. In other words, a higher VTM2L value indicates more serious distortion and thus a higher-level medium noise in the corresponding reproduction signal.

The effective track width is the width of a track identifiable as including information recorded in a magnetic disk when viewed from a magnetic head. The effective track width is obtained by reproducing information from each track formed in the magnetic disk while shifting the magnetic head in the width direction of the track, and by measuring a reproducible shifting range. A larger effective track width indicates that information is recorded in a magnetic disk in a manner that magnetization orientation to give the information spreads over a wider region around the target track, and thus that the magnitude of magnetic interactions among magnetic grains is high enough to cause such spreading.

In the graph G1 illustrated in FIG. 3, the horizontal and vertical axes represent the effective track width $W_{cw}$ and the VTM2L, respectively. On the graph G1, plotted are points each indicating the effective track width $W_{cw}$ of a track and the VTM2L for the reproduction signal from the track. Specifically, the points on the graph G1 indicate these values in reproducing information respectively from the multiple tracks on the magnetic disks, that is, on the first sample with no nonmagnetic granular layer and the second sample with a nonmagnetic granular layer formed therein. In the graph G1 of FIG. 3, each plot point SMP1 for the first sample is indicated by the square while each plot point SMP2 for the second sample is indicated by the white circle.

Here, a point with smaller VTM2L and effective track width indicates that the reproduction signal from the corresponding track is lower in medium noise level, and that magnetic interactions among magnetic grains in the track is lower in magnitude. In other words, in the graph G1 of FIG. 3, the closer to the lower left corner a point is, the lower the medium noise level and the magnitude of the magnetic interactions among magnetic grains the point indicates. Conversely, the closer to the upper right corner a point is, the higher the medium noise level and the magnitude of the magnetic interactions among magnetic grains the point indicates. In the graph G1 of FIG. 3, the plot points SMP2 for the second sample are plotted closer to the lower left corner than the plot points SMP1 for the first sample. Thus, from the graph G1, it proves that magnetic interactions among magnetic grains are suppressed and medium noise is reduced in level in the second sample with a nonmagnetic granular layer formed therein than those in the first sample with no nonmagnetic granular layer.

Next, the nonmagnetic granular layer 205 will be described more in detail.

In the nonmagnetic granular layer 205 of the magnetic disk 200 of the present embodiment illustrated in FIG. 2, as material to be concentrated at the grain boundaries, $Cr_2O_3$, which is a Cr oxide, is used in place of a material generally known as one to be concentrated at the grain boundaries in a magnetic granular layer, such as $SiO_2$ or $TiO_2$.

Conventionally, $Cr_2O_3$ has been rarely used in a recording layer having a granular structure. This is because $Cr_2O_3$ has a high affinity for alloys that are often used for magnetic grains, such as CoCrPt, and thus is less capable of magnetically separating magnetic grains from one another than materials such as $SiO_2$ and $TiO_2$. Hence, use of $Cr_2O_3$ in a magnetic granular layer is not particularly effective at reducing the magnitude of magnetic interactions among magnetic grains and thus the medium noise level. Moreover, $Cr_2O_3$ has been rarely used as material to be concentrated at the grain boundaries of nonmagnetic grains in a nonmagnetic granular layer, because of a concern that $Cr_2O_3$ may adversely affect the magnetic properties of the recording layer, for example. However, from the experiment to be described below, the present inventor finds out that use of $Cr_2O_3$ as material to be concentrated at the grain boundaries of nonmagnetic grains in a nonmagnetic granular layer is highly effective at reducing the magnitude of magnetic interactions among magnetic grains and thus the medium noise level in a recording layer formed on the nonmagnetic granular layer.

In this example, third and fourth samples are prepared. Each third sample is a magnetic disk in which $SiO_2$ is used in a nonmagnetic granular layer in a conventional manner, while each fourth sample is a magnetic disk in which $Cr_2O_3$ is used in a nonmagnetic granular layer as in the magnetic disk 200 of the present embodiment. As in the example illustrated in FIG. 3, a VTM2L indicating a medium noise level and an effective track width indicating the magnitude of magnetic interactions is calculated for each track in these samples. In addition, the M-H loop slope of a recording layer is calculated for each sample. Here, the M-H loop slope represents a coercivity, and indirectly represents the grain size of magnetic grains.

Figure 4:
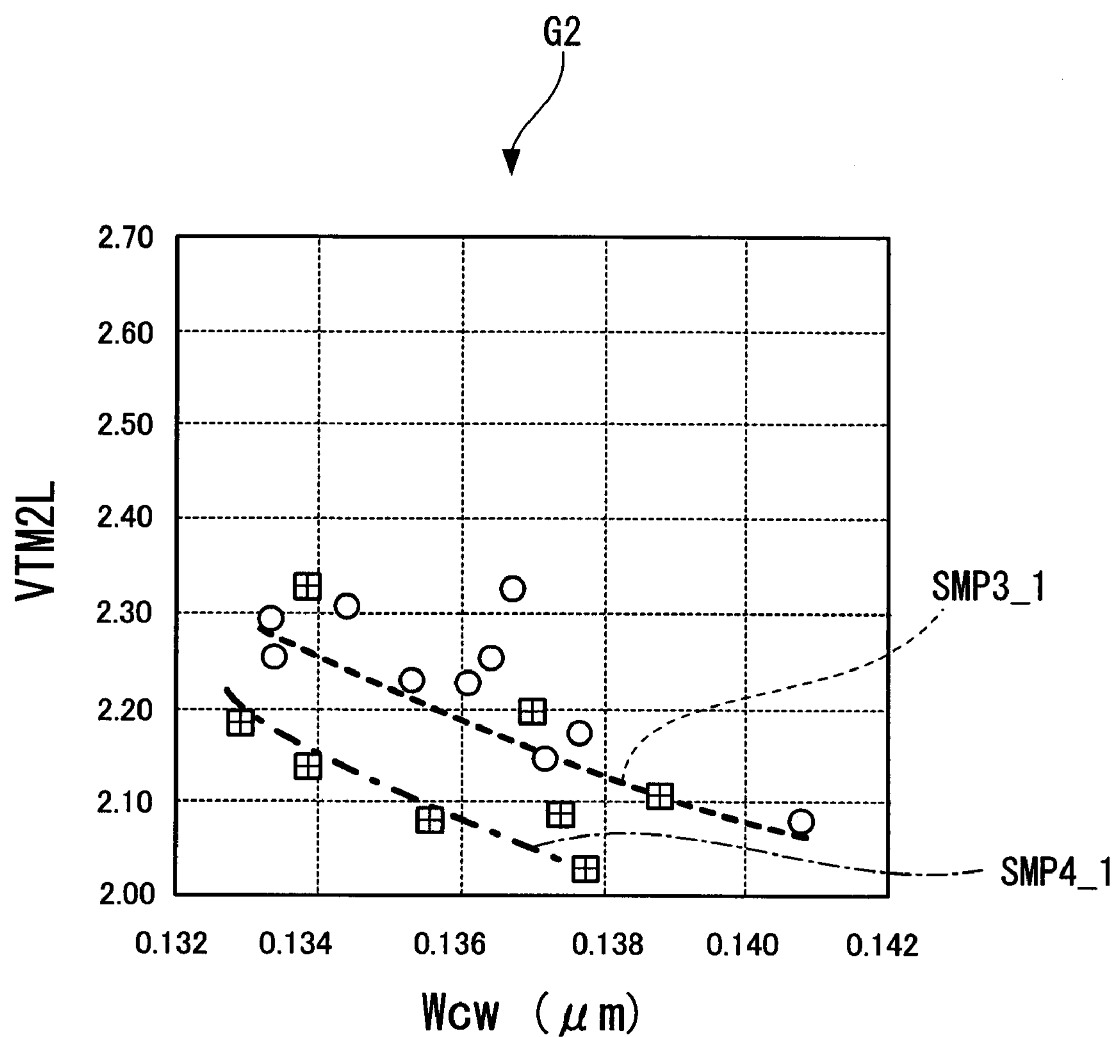
FIG. 4 is a graph describing VTM2L values and effective track widths obtained from third and fourth samples.
Figure 5:
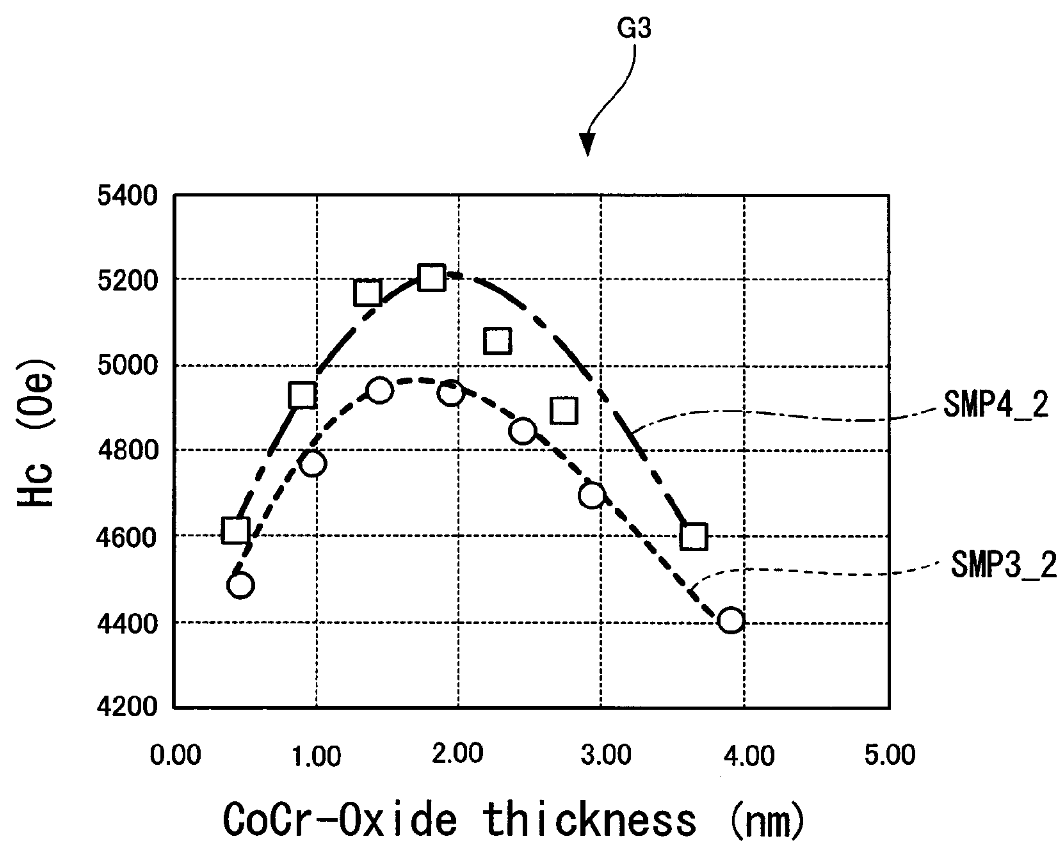
FIG. 5 is a graph describing coercivities of the recording layers in the third and fourth samples.

FIG. 4 is a graph G2 describing VTM2L values and effective track widths obtained from the third and fourth samples. FIG. 5 is a graph G3 describing coercivities of the recording layers in the third and fourth samples, while FIG. 6 is a graph G4 describing M-H loop slopes of the recording layers in the third and fourth samples.

Figure 6:
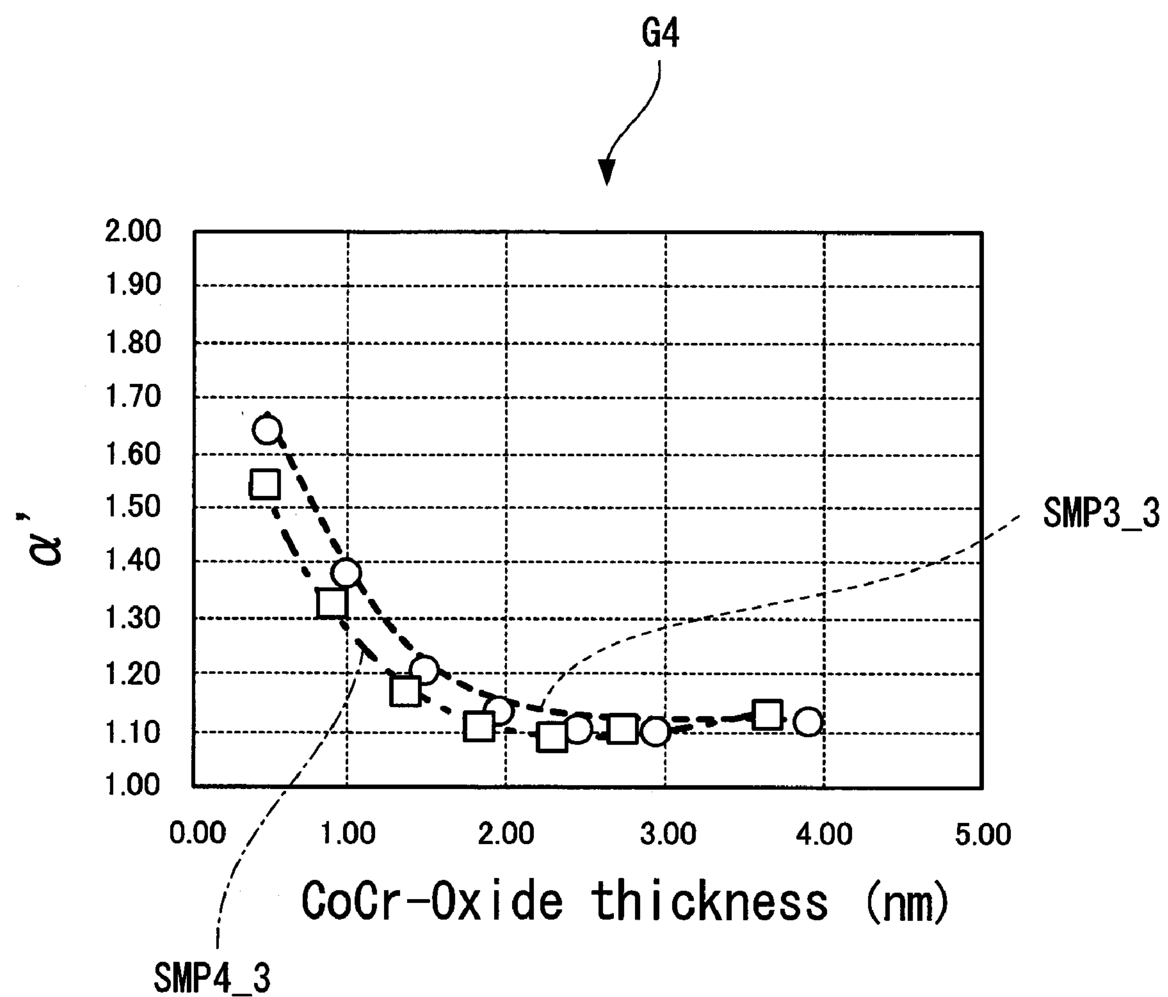
FIG. 6 is a graph describing M-H loop slopes of the recording layers in the third and fourth samples.

Note that, in the examples of FIGS. 4 to 6, nonmagnetic grains in the nonmagnetic granular layer are made of CoCr with a Cr content of "40 at %" or less in each of the third and fourth samples. The $SiO_2$ content in the nonmagnetic granular layer of each third sample is "8 mol %" or less, while the $Cr_2O_3$ content in the nonmagnetic granular layer of each fourth sample is also "8 mol %" or less.

Moreover, in these examples, prepared are multiple third samples having nonmagnetic granular layers of mutually different thicknesses ranging from "0 nm" to "4.0 nm," and multiple different fourth samples similar to the third samples. The VTM2L values and effective track widths are calculated by using the third and fourth samples each having a thickness of "2.5 nm" in the example of FIG. 4, while the coercivities and M-H loop slopes are calculated by using all the third and fourth samples in the examples of FIGS. 5 and 6, among the third samples mutually different in thickness of those layers and the fourth samples mutually different in thickness of those layers.

The third and fourth samples each have the same structure as the magnetic disk 200 of the present embodiment illustrated in FIG. 2 other than the structure of the nonmagnetic granular layer.

In the graph G2 of FIG. 4, the horizontal and vertical axes represent the effective track width $W_{cw}$ and the VTM2L, respectively, as in the graph G1 of FIG. 3. On the graph G2, plotted are points each indicating the effective track width $W_{cw}$ of a track and the VTM2L for the reproduction signal from the track. Specifically, the points on the graph G2 indicate these values obtained from the third sample using $SiO_2$ in the nonmagnetic granular layer, and from the fourth sample using $Cr_2O_3$ in the nonmagnetic granular layer as in the magnetic disk 200 of the present embodiment. In the graph G2, the plot points for the third sample, each indicated by the white circle, are approximately connected by the line SMP3_1, while the plot points for the fourth sample, each indicated by the square, are approximately connected by the line SMP4_1.

As in the graph G1 of FIG. 3, in the graph G2 of FIG. 4 as well, the closer to the lower left corner a point is, the lower the medium noise level and the magnitude of the magnetic interactions among magnetic grains the point indicates. Conversely, the closer to the upper right corner a point is, the higher the medium noise level and the magnitude of the magnetic interactions among magnetic grains the point indicates. In the graph G2 of FIG. 4, the line SMP4_1 for the fourth sample lies closer to the lower left corner than the line SMP3_1 for the third sample. Thus, from the graph G2, it proves that magnetic interactions among magnetic grains are suppressed and medium noise is reduced in level in the fourth sample using $Cr_2O_3$ in the nonmagnetic granular layer than those in the third sample using $SiO_2$ in the nonmagnetic granular layer.

Meanwhile, in the graph G3 of FIG. 5, the horizontal and vertical axes represent the thickness of a nonmagnetic granular layer and the coercivity of a recording layer, respectively. On the graph G3, plotted are points each indicating the coercivity corresponding to a nonmagnetic granular layer of a certain thickness. Specifically, the points on the graph G3 indicate these values obtained from the third samples mutually different in thickness of those layers and the fourth samples mutually different in thickness of those layers. In the graph G3, the plot points for the respective third samples, each indicated by the white circle, are approximately connected by the line SMP3_2, while the plot points for the respective fourth samples, each indicated by the square, are approximately connected by the line SMP4_2.

From the graph G3 of FIG. 5, it proves that in the entire thickness range from "0.5 nm" to "4.0 nm," each fourth sample using $Cr_2O_3$ in the nonmagnetic granular layer has a higher coercivity than the third sample using $SiO_2$ in the nonmagnetic granular layer having the same thickness as in this fourth sample. In addition, it proves that the coercivity difference between the third and fourth samples each having a thickness of "2.5 nm" is approximately "200 Oe."

Meanwhile, in the graph G4 of FIG. 6, the horizontal and vertical axes represent the thickness of a nonmagnetic granular layer and the M-H loop slope of a recording layer, respectively. On the graph G4, plotted are points each indicating the M-H loop slope corresponding to a nonmagnetic granular layer of a certain thickness. Specifically, the points on the graph G4 indicate these values obtained from the third samples mutually different in thickness of those layers and the fourth samples mutually different in thickness of those layers. In addition, the plot points for the respective third samples, each indicated by the white circle, are approximately connected by the line SMP3_3, while the plot points for the respective fourth samples, each indicated by the square, are approximately connected by the line SMP4_3.

Generally, the intensity of magnetization of the entire magnetic body is changed by orienting the magnetization of each of magnetic grains forming the magnetic body in a magnetic field in the same direction as the orientation of the magnetic field. Here, the smaller the grain size of the magnetic grains is, the larger the number of magnetic grains per unit volume is, and thus the more difficult it is to orient the magnetization of the magnetic grains in the direction. As a result, the M-H loop slope of the magnetic body is reduced as the grain size of the magnetic grains is reduced.

In other words, in the graph G4 of FIG. 6, the smaller M-H loop slope indicates that the magnetic grains in the granular structure of the recording layer are better separated from one another, and thus are reduced more in grain size. In the graph G4 of FIG. 6, the M-H loop slope is small when the nonmagnetic granular layer has a thickness ranging from "2.0 nm" to "3.0 nm," inclusive. Accordingly, it proves that those magnetic grains are better separated from one another, and thus are reduced more in grain size.

This indicates that for the magnetic recording medium described above in SUMMARY, it is preferable that the nonmagnetic granular layer has a thickness not less than 2.0 nm but not more than 3.0 nm.

As described hereinabove with reference to FIGS. 4 to 6, use of $Cr_2O_3$ as material to be concentrated at the grain boundaries of nonmagnetic grains in a nonmagnetic granular layer is highly effective at reducing the magnitude of magnetic interactions among magnetic grains and thus reducing the medium noise level in a recording layer formed on the nonmagnetic granular layer, and the like. Moreover, such effects are enhanced as compared to the case of using $SiO_2$ in the nonmagnetic granular layer in the following conditions. Specifically, the nonmagnetic granular layer preferably has a thickness ranging from "2.0 nm" to "3.0 nm," inclusive, since the magnetic grains therein are better separated from one another, and thus are reduced more in grain size in this case. Moreover, when this thickness is approximately "2.5 nm," the coercivity of the recording layer thereon is largest.

With these considered, in the magnetic disk 200 of the present embodiment illustrated in FIG. 2, the nonmagnetic granular layer 205 has a thickness of approximately "2.5 nm."

In addition, as described above, the nonmagnetic granular layer 205 in the present embodiment includes nonmagnetic grains made of CoCr that is nonmagnetic with a Cr content adjusted in a range from "30 at %" to "50 at %," and each having a hexagonal close-packed crystal structure.

The present inventor finds out that the nonmagnetic granular layers using CoCr having Cr contents in that range provide effects equivalent to one another, from the experiment to be described below. In addition, as described above, a recording layer including magnetic grains of a hexagonal close-packed crystal structure preferably is formed on a nonmagnetic granular layer having nonmagnetic grains of a hexagonal close-packed crystal structure as in the magnetic disk 200 of the present embodiment, even though crystals having a hexagonal close-packed crystal structure can be grown on crystals having a face-centered cubic lattice crystal structure. The present inventor tests this point through the experiment.

In this experiment, fifth to seventh samples are prepared. The fifth and sixth samples are different from each other in Cr content of CoCr in the nonmagnetic granular layers in a manner that these Cr contents of CoCr range from "30 at %" to "50 at %," while the seventh sample has a nonmagnetic granular layer including nonmagnetic grains of a face-centered cubic lattice crystal structure. As in the example of FIG. 3, the VTM2L values each representing the medium noise level, and the effective track widths each indicating the magnitude of magnetic interactions are calculated from the samples.

Figure 7:
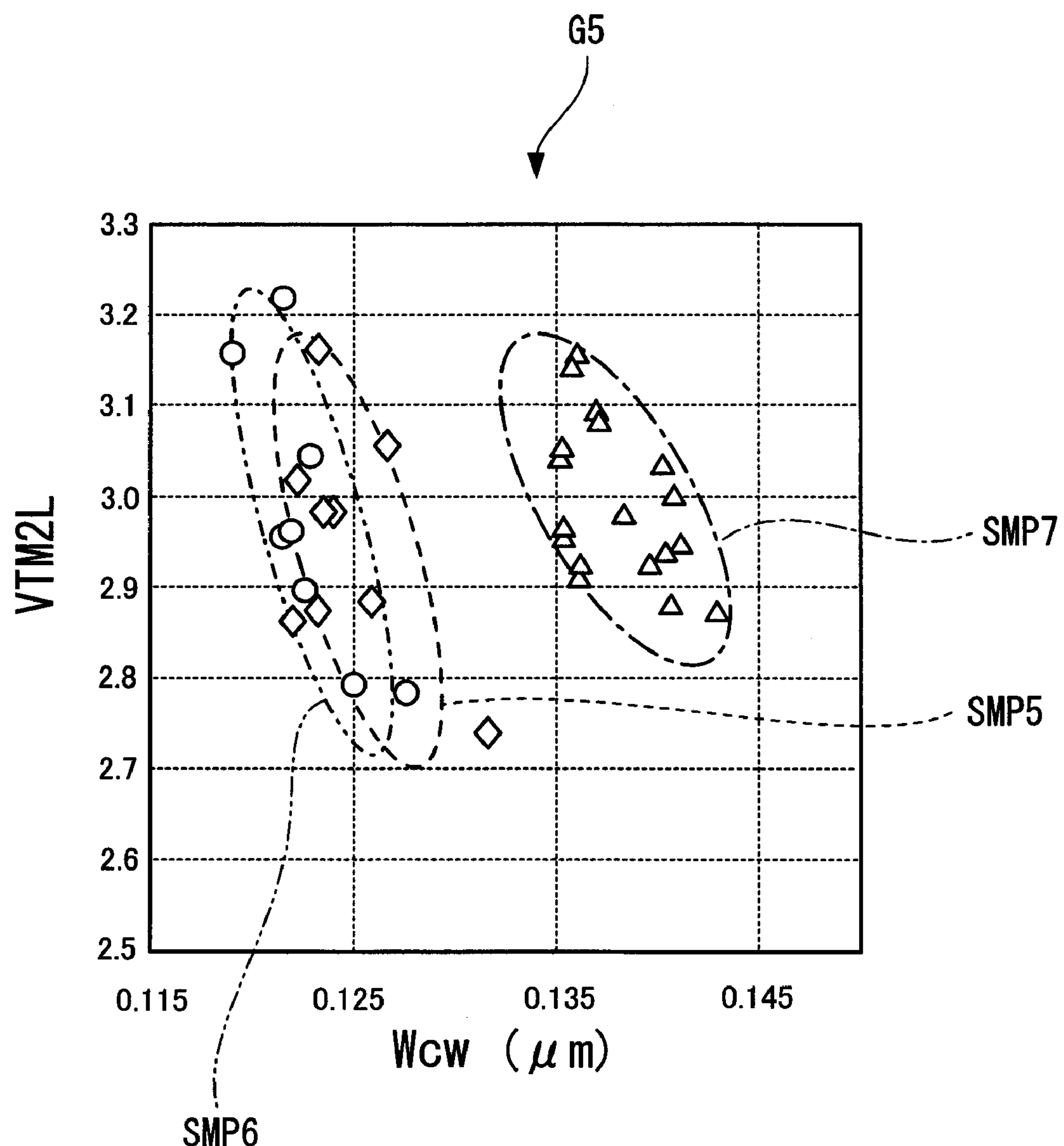
FIG. 7 is a graph describing VTM2L values and effective track widths of fifth to seventh samples.

FIG. 7 is a graph describing VTM2L values and effective track widths of the fifth to seventh samples.

Note that, in this example of FIG. 7, as the material of the nonmagnetic grains in the nonmagnetic granular layer, CoCr whose Cr content is "40 at %" is used in the fifth sample while CoCr whose Cr content is "30 at %" is used in the sixth sample. In addition, the $Cr_2O_3$ content in the nonmagnetic granular layer is "4.5 mol %" in each of these two samples.

Meanwhile, as the material of the nonmagnetic grains in the nonmagnetic granular layer, NiW, which has a face-centered cubic lattice structure, is used in the seventh sample.

In addition, each of the nonmagnetic granular layers in the respective three samples has a thickness of "2.5 nm," and the three samples each have the same structure as the magnetic disk 200 of the present embodiment illustrated in FIG. 2 other than the structure of the nonmagnetic granular layer.

As in the graph G1 of FIG. 3, in the graph G5 of FIG. 7 as well, the horizontal and vertical axes represent the effective track width $W_{cw}$ and the VTM2L, respectively. On the graph G5, plotted are points each indicating an effective track width $W_{cw}$ and the corresponding VTM2L. Specifically, the points on the graph G5 indicate these values obtained from the fifth to seventh samples. In the graph G5 of FIG. 7, each plot point SMP5 for the fifth sample is indicated by the diamond, each plot point SMP6 for the sixth sample is indicated by the white circle, and each plot point SMP7 for the seventh sample is indicated by the triangle.

First of all, the plot points SMP5 for the fifth sample lie at positions nearly equivalent to the plot points SMP6 for the sixth sample in this graph G5 of FIG. 7. From this finding, it proves that the nonmagnetic granular layers using CoCr that has Cr contents ranging from "30 at %" to "50 at %" provide mutually equivalent effects of reducing the magnitude of magnetic interactions among magnetic grains and thus the medium noise level in a recording layer.

Additionally, the plot points SMP7 for the seventh sample lie closer to the upper right corner than the plot points for the other samples in this graph G5 of FIG. 7. Here, the seventh sample has the nonmagnetic granular layer including nonmagnetic grains of a face-centered cubic lattice crystal structure, while each of the other samples has the nonmagnetic granular layer including nonmagnetic grains of a hexagonal close-packed crystal structure, as described above. From this finding, it proves that the nonmagnetic granular layer having magnetic grains of a hexagonal close-packed crystal structure, that is the same crystal structure as the magnetic grains in the recording layer, is more effective at reducing the magnitude of magnetic interactions among magnetic grains and thus reducing the medium noise level in a recording layer.

In light of these experiment results, the magnetic disk 200 of the present embodiment illustrated in FIG. 2 includes the nonmagnetic granular layer 205 having nonmagnetic grains made of CoCr that is nonmagnetic with a Cr content adjusted in a range from "30 at %" to "50 at %," and each having a hexagonal close-packed crystal structure, as described above.

Note that, as examples of the nonmagnetic granular layer described above in SUMMARY, described above are: the nonmagnetic granular layer of the embodiment whose $Cr_2O_3$ content is not particularly specified but only defined as not more than "12 mol %;" and those in the experimental examples whose $Cr_2O_3$ contents are "8 mol %" or less and "4.5 mol %," respectively. However, the nonmagnetic granular layer described above in SUMMARY is not limited to those in these experimental examples, but may have any $Cr_2O_3$ content not more than "12 mol %" other than those in the examples, for example.

Moreover, as examples of the nonmagnetic granular layer described above in SUMMARY, described above are: the nonmagnetic granular layer of the embodiment including nonmagnetic grains whose Cr content is not particularly specified but only defined as ranging from "30 at %" to "50 at %;" and those in the experimental examples whose Cr contents are "40 at %" or less, "30 at %," and "40 at %," respectively. However, the nonmagnetic granular layer described above in SUMMARY is not limited to those in these experimental examples, but may have any Cr content ranging from "30 at %" to "50 at %" other than those in the examples, for example.

Additionally, as an example of the nonmagnetic granular layer described above in SUMMARY, described above is the nonmagnetic granular layer 205 having a thickness of approximately "2.5 nm." However, the nonmagnetic granular layer described above in SUMMARY is not limited to this, but may have a thickness other than "2.5 nm," for example.

Additionally, as an example of the magnetic granular layer described above in SUMMARY, described above is the recording layer 206 in which magnetic grains made of CoCrPt are segregated from one another by $TiO_2$ concentrated at the grain boundaries. However, the magnetic granular layer described above in SUMMARY is not limited to this, but may have a structure in which the magnetic grains made of at least one alloy selected from CoCr, CoCrPtCu, CoCrPtB and CoCrPtBCu are segregated from one another by an oxide or a nitride containing at least one material selected from Si, Ti, Cr, Ta, Zr, W and Nb and concentrated at the grain boundaries, for example.

Additionally, as an example of the interlayers according to the additional features, described above is the interlayer 204 made of Ru. However, the interlayers according to the additional features are not limited to this, but may include an $RuX_2$ alloy (X is Co, Cr, W or Re), for example.

In the magnetic recording medium described above in SUMMARY, the magnetic granular layer is used as a recording layer into which information is recorded by orienting magnetization in the magnetic grains in a direction according to the information. In addition, in this magnetic recording medium, the magnetic grains are separated from one another to be reduced in grain size by forming the magnetic granular layer on the nonmagnetic granular layer. This can reduce magnetic interactions among the magnetic grains in the magnetic granular layer used as a recording layer, and thus increase the coercivity thereof to suppress medium noise. Consequently, recording information in the recording layer with high recording density is possible.

Including the magnetic recording medium described above in SUMMARY, which enables still higher-density recording, an information storage apparatus can have a larger storage capacity to allow information to be recorded therein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A magnetic recording medium, comprising:

a nonmagnetic granular layer that has a granular structure in which a plurality of nonmagnetic grains made of a nonmagnetic material are separated from one another by a Cr oxide;

a magnetic granular layer that is formed on the nonmagnetic granular layer and has a granular structure in which a plurality of magnetic grains made of a magnetic material are separated from one another by a nonmagnetic material, an interlayer made of a nonmagnetic material;

a soft magnetic underlayer made of a soft magnetic material; and an underlayer that is formed on the soft magnetic underlayer, and is made of a nonmagnetic material having a face-centered cubic lattice crystal structure, and having a surface on which a [1,1,1] plane appears, wherein the nonmagnetic granular layer is formed on the interlayer, and wherein the interlayer is formed on the underlayer.

2. The magnetic recording medium according to claim 1, wherein the magnetic granular layer is formed by growing the magnetic grains on the nonmagnetic grains in the nonmagnetic granular layer.

3. The magnetic recording medium according to claim 1, wherein the nonmagnetic granular layer has, as the nonmagnetic grains, nonmagnetic grains of a hexagonal close-packed crystal structure whose C-axis orients in the thickness direction of the nonmagnetic granular layer.

4. The magnetic recording medium according to claim 1, wherein the interlayer includes a nonmagnetic material having a hexagonal close-packed crystal structure whose C-axis orients in the thickness direction of the interlayer.

5. The magnetic recording medium according to claim 1, wherein the interlayer is made of a material containing Ru or a material containing a $RuX_2$ alloy, where X is Co, Cr, W or Re.

6. The magnetic recording medium according to claim 1, wherein the nonmagnetic granular layer has a thickness not less than 2.0 nm but not more than 3.0 nm.

7. The magnetic recording medium according to claim 1, wherein the nonmagnetic grains in the nonmagnetic granular layer are made of CoCr.

8. The magnetic recording medium according to claim 1, wherein, in the magnetic granular layer, the magnetic grains are made of at least one alloy selected from CoCr, CoCrPt, CoCrPtCu, CoCrPtB and CoCrPtBCu, and the nonmagnetic material is an oxide or a nitride containing at least one material selected from Si, Ti, Cr, Ta, Zr, W and Nb.

9. An information storage apparatus, comprising:

a magnetic recording medium including:

a nonmagnetic granular layer that has a granular structure in which a plurality of nonmagnetic grains made of a nonmagnetic material are separated from one another by a Cr oxide, and a magnetic granular layer that is formed on the nonmagnetic granular layer and has a granular structure in which a plurality of magnetic grains made of a magnetic material are separated from one another by a nonmagnetic material; and an interlayer made of a nonmagnetic material;

a soft magnetic underlayer made of a soft magnetic material; and an underlayer that is formed on the soft magnetic underlayer, and is made of a nonmagnetic material having a face-centered cubic lattice crystal structure, and having a surface on which a [1,1,1] plane appears, wherein the nonmagnetic granular layer is formed on the interlayer, and wherein the interlayer is formed on the underlayer, and a head that records information into the nonmagnetic granular layer of the magnetic recording medium.

10. The information storage apparatus according to claim 9, wherein the magnetic granular layer is formed by growing the magnetic grains on the nonmagnetic grains in the nonmagnetic granular layer.

11. The information storage apparatus according to claim 9, wherein the nonmagnetic granular layer has, as the nonmagnetic grains, nonmagnetic grains of a hexagonal close-packed crystal structure whose C-axis orients in the thickness direction of the nonmagnetic granular layer.

12. The information storage apparatus according to claim 9, wherein the interlayer includes a nonmagnetic material having a hexagonal close-packed crystal structure whose C-axis orients in the thickness direction of the interlayer.

13. The information storage apparatus according to claim 9, wherein the interlayer is made of a material containing Ru or a material containing a $RuX_2$ alloy, where X is Co, Cr, W or Re.

14. The information storage apparatus according to claim 9, wherein the nonmagnetic granular layer has a thickness not less than 2.0 nm but not more than 3.0 nm.

15. The information storage apparatus according to claim 9, wherein the nonmagnetic grains in the nonmagnetic granular layer are made of CoCr.

16. The information storage apparatus according to claim 9, wherein, in the magnetic granular layer, the magnetic grains are made of at least one alloy selected from CoCr, CoCrPt, CoCrPtCu, CoCrPtB and CoCrPtBCu, and the nonmagnetic material is an oxide or a nitride containing at least one material selected from Si, Ti, Cr, Ta, Zr, W and Nb.

* * * * *